US012272088B2

(12) United States Patent
Chun et al.

(10) Patent No.: US 12,272,088 B2
(45) Date of Patent: Apr. 8, 2025

(54) METHOD FOR DETECTING CROSSWALK USING LIDAR SENSOR AND CROSSWALK DETECTION DEVICE FOR PERFORMING THE METHOD

(71) Applicant: Vueron Technology Co., Ltd., Seoul (KR)

(72) Inventors: Changhwan Chun, Seoul (KR); Seungyong Lee, Seoul (KR)

(73) Assignee: Vueron Technology Co., Ltd., Seoul (KR)

( * ) Notice: Subject to any disclaimer, the term of this patent is extended or adjusted under 35 U.S.C. 154(b) by 640 days.

(21) Appl. No.: 17/582,678

(22) Filed: Jan. 24, 2022

(65) Prior Publication Data

US 2023/0111364 A1    Apr. 13, 2023

(30) Foreign Application Priority Data

Oct. 13, 2021    (KR) .......................... 10-2021-0135744

(51) Int. Cl.
    *G01S 17/89*    (2020.01)
    *G06N 7/00*     (2023.01)
    *G06T 7/70*     (2017.01)

(52) U.S. Cl.
    CPC .............. *G06T 7/70* (2017.01); *G01S 17/89* (2013.01); *G06N 7/00* (2013.01); *G06T 2207/20021* (2013.01); *G06T 2207/20224* (2013.01)

(58) Field of Classification Search
    CPC ............ G06T 7/70; G06T 2207/20021; G06T 2207/20224; G01S 17/89; G01S 7/4808; G01S 17/931; G06N 7/00; G06V 20/588
    See application file for complete search history.

(56) References Cited

U.S. PATENT DOCUMENTS

2020/0125112 A1 *    4/2020    Mao ...................... G06F 18/217
2021/0097308 A1 *    4/2021    Kumar .................... G01S 17/89

FOREIGN PATENT DOCUMENTS

KR    10-1843866 B1    5/2018

OTHER PUBLICATIONS

Bindin Li et al., "Lane Marking Quality Assessment for Autonomous Driving"; 2018 IEEE/RSJ International Conference on Intelligent Robots and Systems (IROS); Oct. 1-5, 2018; pp. 8443-8448.

* cited by examiner

Primary Examiner — Kent Yip
(74) Attorney, Agent, or Firm — Bridgeway IP Law Group, PLLC; Jihun Kim

(57) ABSTRACT

A method for detecting a crosswalk using a crosswalk detection device is provided. The method includes acquiring point data around a lidar sensor from the lidar sensor, detecting one or more crosswalk points among a plurality of points included in the point data based on intensities of the plurality of points; and detecting the crosswalk based on positions of the detected crosswalk points.

16 Claims, 8 Drawing Sheets

METHOD FOR DETECTING CROSSWALK USING LIDAR SENSOR AND CROSSWALK DETECTION DEVICE FOR PERFORMING THE METHOD

CROSS-REFERENCE TO RELATED APPLICATION

This application claims priority to Korean Patent Application No. 10-2021-0135744, filed on Oct. 13, 2021. The entire contents of the application on which the priority is based are incorporated herein by reference.

TECHNICAL FIELD

The present disclosure relates to a method for detecting a crosswalk using a lidar sensor and a crosswalk detection device performing the method.

BACKGROUND

Light detection and ranging (Lidar) is a method for determining ranges (variable distance) by measuring the time for a reflected laser beam from a target object to return to the receiver using a high-power pulsed laser. The Lidar is currently used in various field such as a field of autonomous vehicles, a field of global environment monitoring, a field of atmosphere analysis, and a field of unmanned vehicles. Recently, since the LiDAR is used as a core technology of a 3D image camera and a laser scanner for autonomous/unmanned vehicles, and a 3D reverse engineering, the utilization and importance of the lidar sensor has been increased.

In order to achieve an autonomous driving, it is necessary to determine (perceive) the vehicle's position (vehicle localization) accurately and precisely. Currently, the vehicle localization is commonly performed by using a GPS sensor. However, for the autonomous driving, a vehicle's position should be determined within an error of a few centimeters, which necessitates a more precise and accurate measurement of the vehicle's position.

To detect the vehicle's position more accurately, it is a common practice to fuse and complement the information detected using sensors installed in the vehicle such as an inertial measurement device or an odometer and the information detected using sensors installed external to the vehicle, such as GPS, lidar, camera, and radar. These sensors installed external to the vehicle may extract feature information of a road such as building walls, guardrails, lane lines of a lane, landmarks, and traffic lights. Then, the extracted information is used to estimate the accurate position of the vehicle along with a high definition map (HD map).

Among the information related to the position of the vehicle, position information of a crosswalk may be used to estimate a longitudinal position of the vehicle while an autonomous driving vehicle travels in an urban area. Thus, a precise crosswalk detection result may help improve the performance of precision positioning.

Conventionally, camera sensors are the only sensor for detecting the crosswalk. However, the camera sensors show severe performance degradation for the crosswalk detection due to sudden illumination changes and hardly provide accurate range information. Further, in case of using the camera sensors, there may be misrecognition cases due to various factors (e.g., shadows) in the driving environment that may be caused by light.

Accordingly, there is a demand for a method for robustly detecting the crosswalk under an environment having sudden illumination changes and the various driving environment.

SUMMARY

In view of the above, the present disclosure provides a method for detecting a crosswalk using a lidar sensor.

Technical objects to be achieved by the present disclosure are not limited to those described above, and other technical objects not mentioned above may also be clearly understood from the descriptions given below by those skilled in the art to which the present disclosure belongs.

In accordance with an aspect of the present disclosure, there is provided a method for detecting a crosswalk using a crosswalk detection device, the method including: acquiring point data around a lidar sensor from the lidar sensor; detecting one or more crosswalk points among a plurality of points included in the point data based on intensities of the plurality of points; and detecting the crosswalk based on positions of the detected crosswalk points.

Further, the detecting of the one or more crosswalk points may include dividing the plurality of points into the one or more crosswalk points and one or more ground points constituting a ground by applying a Gaussian mixture model to the intensities of the plurality of points.

Further, the detecting of the one or more crosswalk points may include dividing a surrounding area detected by the crosswalk detection device or the lidar sensor into crosswalk cells each of which has a predetermined length in a moving direction of a driving vehicle and a predetermined width in a direction perpendicular to the moving direction of the driving vehicle, and detecting, among the one or more crosswalk points included in the point data, one or more crosswalk points in each of the crosswalk cells.

Further, the detecting of the one or more crosswalk points may include calculating a threshold for point intensity by applying a Gaussian mixture model to a plurality of points included in each of the crosswalk cells among the plurality of points included in the point data based on differences between intensities of the plurality of points included in each of the crosswalk cells, and determining one or more points having intensities equal to or greater than the threshold, among the plurality of points included in each of the crosswalk cells, as the one or more crosswalk points.

The method described above may further include detecting a ground based on the intensities of the plurality of points included in the point data before the detecting of the one or more crosswalk points. The detecting of the ground may include generating a first plane by using first points selected from the plurality of points, generating a second plane which is different from the first plane by using second points selected from the plurality of points, and determining the first plane as the ground when the number of first inlier points included in the first plane is greater than the number of second inlier points included in the second plane. Further, the one or more crosswalk points may be included in the first plane.

Further, the detecting of the crosswalk may include dividing a surrounding area detected by the crosswalk detection device or the lidar sensor into crosswalk candidate areas each of which has a predetermined length in a moving direction of a driving vehicle and a predetermined width in a direction perpendicular to the moving direction of the driving vehicle, and detecting a crosswalk area by determining whether each of the crosswalk candidate areas corresponds to the crosswalk area based on positions of one or more crosswalk points included in each of the divided crosswalk candidate areas among the detected one or more crosswalk points.

Further, the detecting of the crosswalk area may include sequentially selecting index values, among integers equal to or greater than 0, for the one or more crosswalk points included in each of the crosswalk candidate areas among the detected one or more crosswalk points, the index values being sequentially selected based on an angle between a reference line extending in a horizontal direction from the lidar sensor and a straight line connecting the lidar sensor and each of the one or more crosswalk points included in each of the crosswalk candidate areas; connecting adjacent crosswalk points of which the index values are the closest to each other among the one or more crosswalk points included in each of the crosswalk candidate areas, only if a distance between the adjacent crosswalk points is equal to or smaller than a predetermined first length; generating, for each of the crosswalk candidate areas, a plurality of crosswalk lines each of which straightly connects a crosswalk point having a maximum index value and a crosswalk point having a minimum index value among the connected crosswalk area points; and determining each of the crosswalk candidate areas as the crosswalk area when the number of the generated crosswalk lines, having a length equal to or greater than a predetermined second length, is equal to or greater than a predetermined number.

Further, the sequentially generating of the index values for the one or more crosswalk points may include generating the index values such that a crosswalk point having a greater angle has a greater index value.

Further, the detecting of the crosswalk further may include detecting the crosswalk by connecting the determined crosswalk areas in the moving direction of the driving vehicle.

Further, the method described above may further include inputting a position of a crosswalk detected at a first time point and a moving information of the lidar sensor and estimating a position of the crosswalk at a second time point after the first time point, and correcting the position of the crosswalk using a difference between the estimated position of the crosswalk and the detected position of the crosswalk detected at the second time point.

In accordance with another aspect of the present disclosure, there is provided a crosswalk detection device for detecting the crosswalk, the crosswalk detection device including: a transceiver configured to receive point data from a lidar sensor; and a processor configured to control the transceiver. The processor is configured to detect one or more crosswalk points corresponding to the crosswalk among a plurality of points included in the point data based on intensities of the plurality of points, and detect the crosswalk using the detected crosswalk points.

In accordance with still another aspect of the present disclosure, there is provided a system for detecting a crosswalk, the system including: a lidar sensor configured to acquire point data by detecting a vicinity of the lidar sensor; and a crosswalk detection device for detecting the crosswalk, the crosswalk detection device including: a transceiver configured to receive the point data from the lidar sensor; and a processor configured to control the transceiver. The processor is configured to detect one or more crosswalk points corresponding to the crosswalk among a plurality of points included in the point data based on intensities of the plurality of points, and detect the crosswalk using the detected crosswalk points.

In accordance with still another aspect of the present disclosure, there is provided a non-transitory computer-readable storage medium storing computer-executable instructions which cause, when executed by a processor, the processor to perform a method for detecting a crosswalk using a crosswalk detection device, the method including: acquiring point data around a lidar sensor from the lidar sensor; detecting one or more crosswalk points corresponding to the crosswalk among a plurality of points included in the point data based on intensities of the plurality of points; and detecting the crosswalk using the detected crosswalk points.

According to the aspects of the present disclosure, by using an adaptable crosswalk point extraction method based on cells using the point data acquired from the lidar sensor, it is possible to robustly detect the crosswalk under an environment having sudden illumination changes and the various driving environment.

Further, by detecting a ground (ground surface) using the lidar sensor and detecting the crosswalk using crosswalk points after being extracted, it is possible to provide accurate range information. Furthermore, by recognizing (perceiving) the accurate position of the vehicle, it is possible to provide information that can be used for additional functions such as a risk determination for objects around the crosswalk and a vehicle speed control when detecting the crosswalk.

DETAILED DESCRIPTION

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
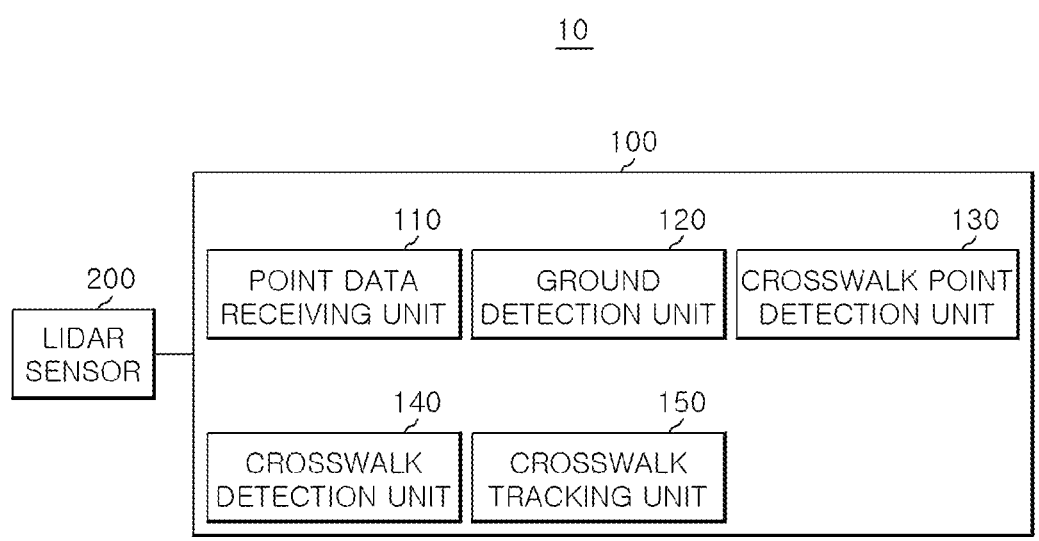
FIG. 1 is a block diagram showing an example of a crosswalk detection system including a crosswalk detection device and a lidar sensor according to an embodiment of the present disclosure.

FIG. 1 is a block diagram showing an example of a crosswalk detection system including a crosswalk detection device and a lidar sensor according to an embodiment of the present disclosure.

In the present disclosure, for the sake of the convenience of description, a case where a crosswalk detection system 10 is installed in a driving vehicle with which one or more lidar sensors are equipped (hereinafter, simply referred to as a vehicle) is mainly described. However, the present disclosure is not limited thereto, and the crosswalk detection system 10 may be installed in an unmanned moving object such as a drone or other types of moving objects such as a vehicle, a motorcycle, a flight vehicle, and the like as well as the driving vehicle equipped with the lidar sensors such as an autonomous vehicle.

In addition, in the present disclosure, a case where a lidar sensor 200 is provided separately from a crosswalk detection device 100 to transmit point data to the crosswalk detection device 100 is mainly described. However, the present disclosure is not limited thereto. For example, depending on embodiments, the crosswalk detection device 100 may include the lidar sensor 200. In this case, the lidar sensor 200 may transmit the point data to a point data receiver 110 to be described later through internal signaling.

The lidar sensor 200 may emit a laser beam (light pulse) in a predetermined direction, for example, 360-degree directions including not only a direction in which the driving vehicle with the crosswalk detection device 100 moves (forward direction) but also lateral and backward directions of the driving vehicle with the crosswalk detection device. The lidar sensor 200 may receive a reflected (or backscattered) laser beam from surrounding terrain and objects, and the reflected laser beam may include one or more point data. The lidar sensor 200 may collect the point data through the reflected laser beam. Here, the point data may be a point cloud including one or more points included in a certain coordinate system. A point in a 3D coordinate system may be defined as X, Y, Z coordinates, and may be used to indicate a surface of an object. Further, the lidar sensor 200 may collect reflection intensities of points included in the point data.

The crosswalk detection device 100 may receive the point data from the lidar sensor 200, and detect a crosswalk positioned around the crosswalk detection device 100 (or the driving vehicle equipped with the crosswalk detection device 100) using the received point data. Further, the crosswalk detection device 100 may stably detect the position of the crosswalk using the detected crosswalk and moving information of the vehicle.

In this connection, the crosswalk detection device 100 may include a point data receiving unit 110, a ground detection unit 120, a crosswalk point detection unit 130, a crosswalk detection unit 140, and a crosswalk tracking unit 150, which are conceptually indicating functions for detecting the crosswalk.

The point data receiving unit 110 may receive point data collected by the lidar sensor 200. The point data received by the point data receiving unit 110 may be the point data acquired around the lidar sensor 200.

The ground detection unit 120 may detect a ground of a road using the point data received by the point data receiving unit 110. Here, the ground of the road may indicate a surface of the road (e.g., a ground surface on which the driving vehicle is located) except obstacles on or around the road.

Depending on embodiments, the ground detection unit 120 may detect the ground of the road using a plane fitting method.

Specifically, the ground detection unit 120 may select a predetermined number (e.g., four) of points among the received point data to generate a plane including selected points ($ax+by+cz+d=0$).

Then, the ground detection unit 120 may determine inlier points for the plane among points different from the points used to generate the plane. Here, the inlier points may indicate points each of which has a perpendicular distance of equal to or smaller than a predetermined value from the generated plane.

The ground detection unit 120 may generate a plurality of planes by repeating the above process multiple times. Among the plurality of generated planes, the ground detection unit 120 may select a plane having the largest number of inlier points as the ground (road's surface) of the road.

The number of times that the process for generating the plane by the ground detection unit 120 is repeated is a predetermined value, which may be determined based on the number of points included in the received point data. For example, the number of times may be the number of cases where a predetermined number of different points are selected among the points included in the received point data or may be a predetermined number that is smaller than the number of cases.

Inlier points included in the ground plane detected by the ground detection unit 120 may include crosswalk points corresponding to the crosswalk and ground points corresponding to the ground.

Then, the crosswalk point detection unit 130 may detect the crosswalk points by distinguishing the ground points and the crosswalk points using intensities of inlier points of the ground plane detected by the ground detection unit 120. This is because that the reflectivity of the crosswalk on the ground of the road is higher than the reflectivity of a surface which does not correspond to the crosswalk.

In an embodiment of the present disclosure, the crosswalk point detection unit 130 may detect the crosswalk points by dividing the acquired plurality of points into the ground points constituting the ground and the crosswalk points by applying a Gaussian mixture model (GMM) to the intensities of the acquired plurality of points.

Further, the crosswalk point detection unit 130 may extract the crosswalk points among the inlier points using a threshold set adaptively for a driving situation (based on a surrounding environment). In other words, the crosswalk point detection unit 130 may compare the intensity of each of the inlier points with the adaptively set threshold, and determine that an inlier point of which the intensity is equal to or greater than the threshold corresponds to the crosswalk point.

The above operation is employed because, in case of extracting the crosswalk points using a single threshold without considering the driving situation (i.e., the surrounding environment), appropriate crosswalk points may not be extracted in response to various driving situations.

Here, the various driving situations may include a situation where the illumination level shows a difference between driving during a daytime, at night, or in the rain or where the amount of illumination shows a rapid change at the time of entering a tunnel or due to shading by a structure or other vehicles.

Accordingly, the crosswalk point detection unit 130 may extract the crosswalk points using the threshold adaptably set in response to the various driving situations, which makes it possible to extract the crosswalk points robustly against the change of the driving situation.

For example, the crosswalk point detection unit 130 may determine crosswalk cells in the surrounding area detected by the crosswalk detection device 100 or the lidar sensor 200, set a threshold adaptably for each of the crosswalk cells, and divide the points into the ground points and the crosswalk points in each of the crosswalk cells. Thus, the crosswalk points are detected.

Here, each crosswalk cell may be an area detected by the crosswalk detection device 100 or the lidar sensor 200. The area may be one of areas from which the point signal of the lidar sensor has been reflected, and it may be an area where the received points reflected from the ground or the crosswalk are included.

Figure 2:
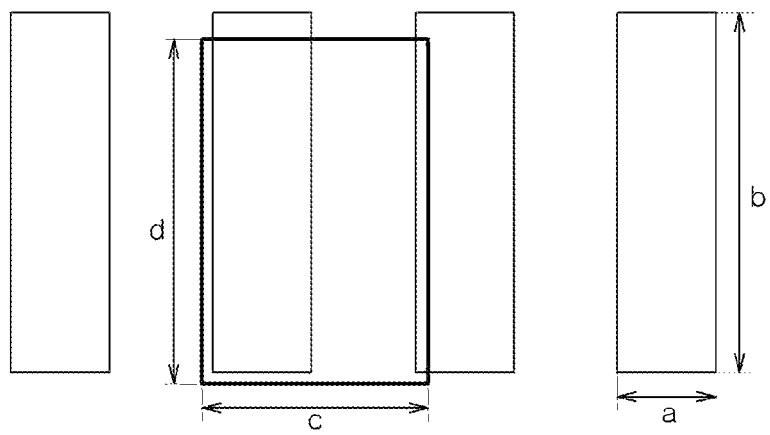
FIG. 2 is an example of setting a crosswalk cell according to the embodiment of the present disclosure.
Figure 2:

FIG. 2 is an example of setting a crosswalk cell according to the embodiment of the present disclosure.

Referring to FIG. 2, a size of a crosswalk block may be defined by a longitudinal length (b) in a direction parallel to the driving direction of the vehicle (v) and a lateral length (a) in a direction perpendicular to the driving direction of the vehicle (v) and parallel to the ground. The size of the crosswalk block (a×b) and a distance between adjacent crosswalk blocks may be defined differently according to laws and regulations of countries. For example, according to the regulation determined by Road Traffic Authority in Republic of Korea, the lateral length (a) of the block of the crosswalk is 50 cm, the longitudinal length (b) of the block of the crosswalk is 600 cm, and the distance between the adjacent crosswalk blocks is 75 cm.

The crosswalk point detection unit 130 may generate a crosswalk cell based on the defined size of the crosswalk according to the regulation. According to the embodiment of the present disclosure, the crosswalk cell generated by the crosswalk point detection unit 130 may be a rectangular cell having a predetermined length in the driving (moving) direction of the vehicle and a predetermined width in the direction perpendicular to the driving direction of the vehicle.

Further, the crosswalk point detection unit 130 may determine a size of the crosswalk cell (c×d) in consideration of the size of the crosswalk. Since the ground points and the crosswalk points are required to be distinguished within the crosswalk cell, the lateral length of the crosswalk cell may be determined to be greater than the lateral length of the crosswalk block or to be greater than a length of a sum of the lateral length of the crosswalk block and the distance between the adjacent crosswalk blocks. For example, the lateral length (c) of the crosswalk cell may be 150 cm, and the longitudinal length of the crosswalk cell (d) may be 500 cm.

The crosswalk point detection unit 130 may distinguish the ground points and the crosswalk points and detect the crosswalk points using a reflection intensity threshold of points calculated by applying a cell-based Gaussian mixture model for each of the crosswalk cells.

More specifically, since the reflection intensity of the crosswalk point included in a crosswalk cell and the reflection intensity of the ground point included in the crosswalk cell are different from each other, if the Gaussian mixture model is applied to the inlier points included in the crosswalk cell, the inlier points may be modeled in a form that two Gaussian distributions are mixed. Then, the crosswalk point detection unit 130 may determine a threshold using the two mixed Gaussian distributions.

Next, the crosswalk point detection unit 130 may detect an inlier point equal to or greater than the threshold determined for each crosswalk cell.

As such, the crosswalk point detection unit 130 determines the crosswalk cells and respectively set the different thresholds for the point intensity to the crosswalk cells, thereby detecting the crosswalk points in each of the crosswalk cells. In this manner, since a fixed threshold is not used, the crosswalk detection device 100 may adaptively detect the crosswalk points in response to the daytime/nighttime or raining situations, and further detect the crosswalk points even if the crosswalk block is in part faded or a shadow area is formed within the crosswalk, for example.

Hereinafter, referring to FIG. 3 to FIG. 6, a method for detecting the crosswalk using the detected crosswalk points by the crosswalk detection device 100 will be explained.

The crosswalk detection unit 140 may determine whether the area in which the crosswalk points are positioned is the crosswalk area or not based on the crosswalk points detected by the crosswalk point detection unit 130, and detect the crosswalk.

Figure 3:
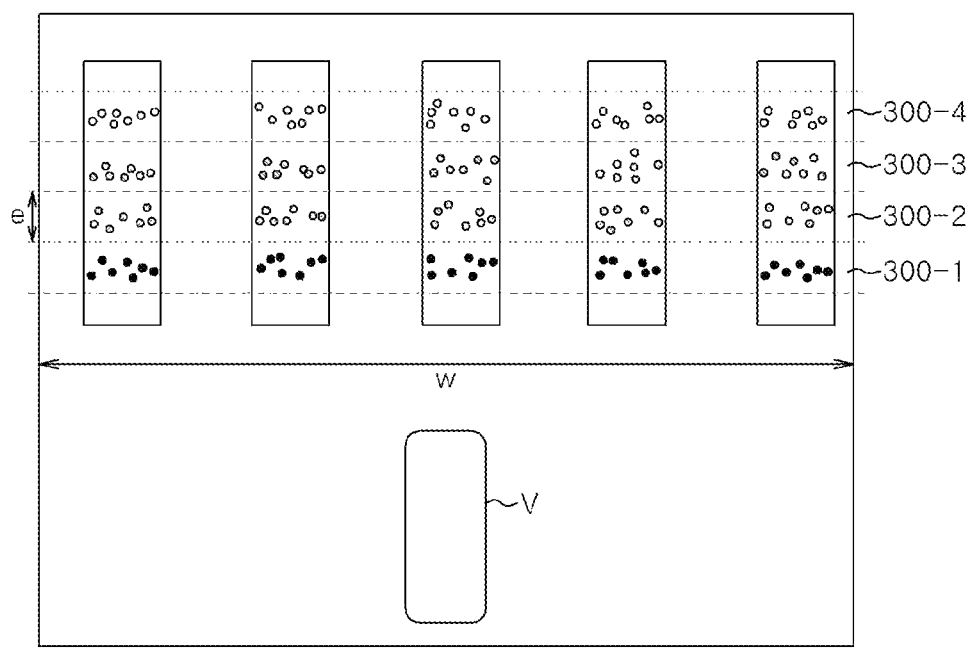
FIG. 3 illustrates an example of determining crosswalk candidate areas by a crosswalk detection unit according to the embodiment of the present disclosure.

FIG. 3 illustrates an example of determining crosswalk candidate areas by the crosswalk detection unit 140 according to the embodiment of the present disclosure.

Referring to FIG. 3, the crosswalk detection unit 140 may determine a plurality of crosswalk candidate areas by dividing the surrounding area detected by the crosswalk detection device 100 into a plurality of areas in a longitudinal direction and detecting, among the plurality of areas, a plurality of crosswalk candidate areas each of which includes the crosswalk points. Each of the crosswalk candidate areas has a predetermined length (e) in the longitudinal direction of the lidar sensor (or the vehicle (V) equipped with the lidar sensor) or in the moving direction of the vehicle and having a predetermined width (w) in a direction perpendicular to the longitudinal direction or the moving direction. The predetermined length (e) may be the same for each crosswalk candidate area and the predetermined width (w) may be the same for each crosswalk candidate area. For example, among the divided areas, the areas in each of which the crosswalk points are positioned may be determined as the crosswalk candidate areas 300-1, 300-2, 300-3, and 300-4. Here, the predetermined length (e) may be 0.2 m. Then, the crosswalk detection unit 140 may determine whether each crosswalk candidate area corresponds to a crosswalk area using distances between the crosswalk points included in each crosswalk candidate area.

Figure 4A:
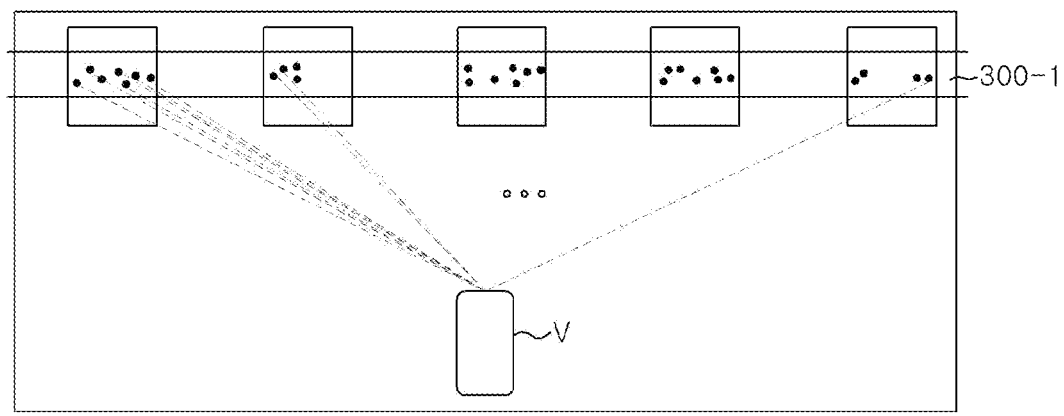
FIGS. 4A and 4B illustrates an example of determining an order of the crosswalk points and compares a distance between the closest crosswalk points with a predetermined distance in each crosswalk candidate area determined by the crosswalk detection unit according to the embodiment of the present disclosure.
Figure 4B:
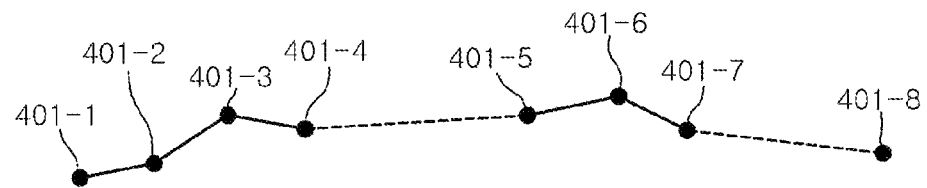

FIGS. 4A and 4B illustrate an example of determining the order of the crosswalk points and compares a distance between the closest crosswalk points with a predetermined distance in each crosswalk candidate area determined by the crosswalk detection unit 140 according to the embodiment of the present disclosure.

Referring to FIG. 4A, the crosswalk detection unit 140 may respectively generate index values, which are integers equal to or greater than 0, for crosswalk points based on the positions of the crosswalk points included in the crosswalk candidate area 300-1. For example, the crosswalk detection unit 140 may sequentially select the index values, among integers equal to or greater than 0, for the crosswalk points based on an angle between a reference line extending in a left horizontal direction from the lidar sensor 200 and a straight line connecting the lidar sensor and a crosswalk point with the lidar sensor 200 as the origin point. Alternatively, the crosswalk detection unit 140 may sequentially select the index values, among the integers equal to or greater than 0, for the crosswalk points based on an angle between a reference line extending in a right horizontal direction from the lidar sensor 200 and a straight line connecting the lidar sensor and a crosswalk point with the lidar sensor 200 as the origin point. For example, the crosswalk detection unit 140 may generate the index values of the crosswalk points such that a crosswalk point having a greater angle has a greater index value.

Then, referring to FIG. 4B, the crosswalk detection unit 140 may connect adjacent crosswalk points of which the index values are the closest to each other among the crosswalk points 401-1 to 401-8 only if a distance between the adjacent crosswalk points is equal to or smaller than a predetermined first length. For example, when the index value is an integer, the closest index value for an index value of 2 is an index value of 1 and an index value of 3. Here, the predetermined first length may be the distance between the crosswalk blocks.

For example, as shown in FIG. 4B, the crosswalk detection unit 140 connects crosswalk points 401-1 to 401-4 and crosswalk points 401-5 to 401-7 since a distance between every two adjacent crosswalk points of which the index values are the closest to each other among the crosswalk points 400-1 to 401-4 and among the crosswalk points 401-5 to 401-7 is equal to or smaller than the predetermined first length. However, the crosswalk detection unit 140 may not connect two adjacent crosswalk points 401-4 and 401-5 of which the index values are the closest to each other and two adjacent crosswalk points 401-7 and 401-8 of which the index values are the closest to each other since distances between the two adjacent crosswalk points 401-4 and 401-5 and between the two adjacent crosswalk points 401-7 and 401-8 are greater than the predetermined first length.

Next, the crosswalk detection unit 140 may generate a plurality of crosswalk lines each straightly connecting a crosswalk point having the smallest index value and a crosswalk point having the greatest index value among the crosswalk points connected to each other. For example, the crosswalk lines may include a line connecting the crosswalk points 401-1 and 401-4 and a line connecting the crosswalk points 401-5 and 401-7.

The crosswalk detection unit 140 may determine whether the crosswalk candidate area 300-1 is a crosswalk area or not using the length of the crosswalk line.

Figure 5:
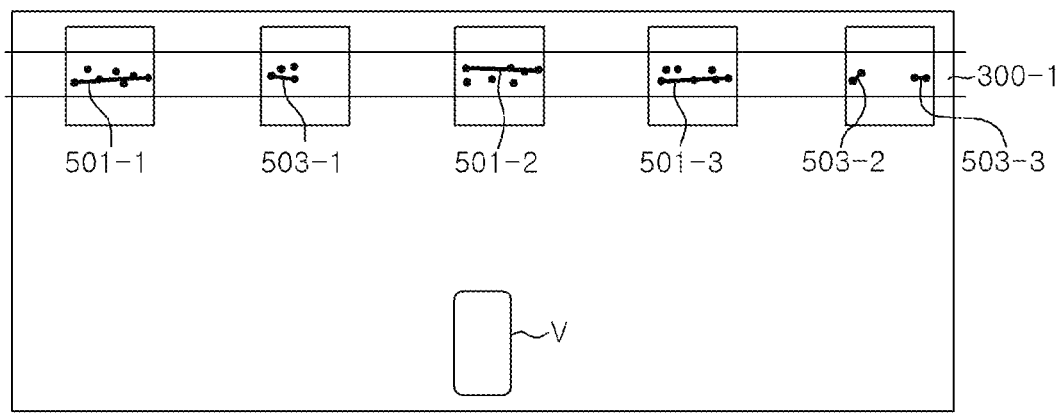
FIG. 5 illustrates an example of determining a crosswalk area by measuring lengths of crosswalk lines in the determined crosswalk candidate area.

FIG. 5 illustrates an example of determining a crosswalk area by measuring lengths of crosswalk lines in the determined crosswalk candidate area.

Referring to FIG. 5, in a case that crosswalk lines 501-1, 501-2, 501-3, 503-1, 503-2, and 503-3 are generated, the crosswalk detection unit 140 may calculate a length of each of the crosswalk lines 501-1, 501-2, 501-3, 503-1, 503-2, and 503-3, and count the number of crosswalk lines each having a calculated length equal to or greater than a predetermined second length.

Then, in a case that the number of the crosswalk lines each having the length equal to or greater than the predetermined second length is greater than a predetermined number, the crosswalk detection unit 140 may determine the crosswalk candidate area 300-1 as the crosswalk area.

For example, the crosswalk detection unit 140 may first determine that the lengths of the crosswalk lines 501-1, 501-2, and 501-3 are equal to or greater than the predetermined second length, and then count the number of the crosswalk lines each having the length equal to or greater than the predetermined second length as 3. If the predetermined number is set as 3, the crosswalk detection unit 140 may determine the crosswalk candidate area 300-1 as the crosswalk area.

Then, the crosswalk detection unit 140 may detect the crosswalk by connecting the determined crosswalk areas. For example, the crosswalk detection unit 140 may determine a longitudinal maximum position and a lateral maximum position using positions where the determined crosswalk areas exist to thereby detect the crosswalk.

Figure 6:
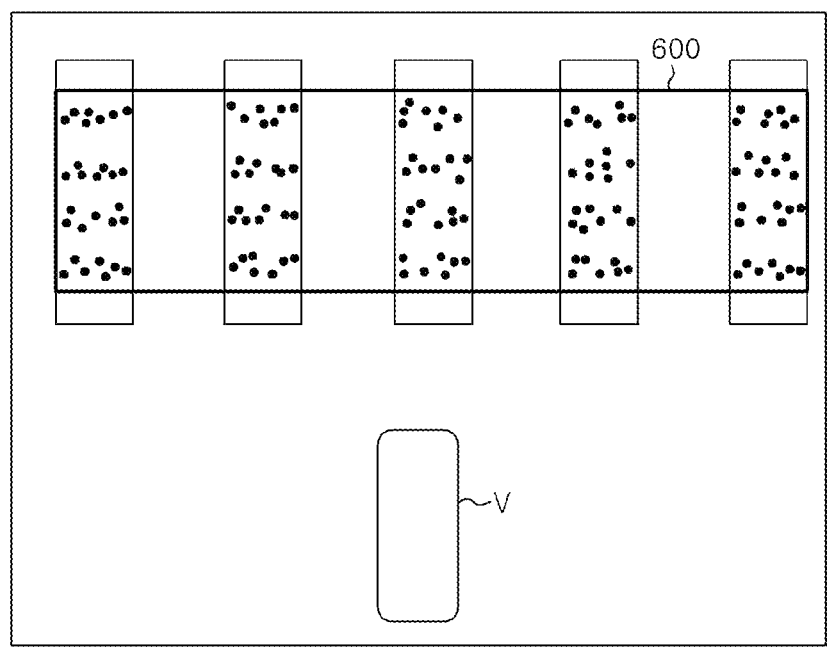
FIG. 6 illustrates an example of detecting a crosswalk by connecting determined crosswalk areas.

FIG. 6 illustrates an example of detecting a crosswalk by connecting determined crosswalk areas.

Referring to FIG. 6, the crosswalk detection unit 140 may connect the determined crosswalk areas, determine longitudinal maximum and minimum positions and lateral maximum and minimum positions using the positions where the determined crosswalk areas exist, and detect the crosswalk 600.

Accordingly, the crosswalk detection device 100 may distinguish points that have reflection intensity greater than that of the ground and are also positioned on arrows or words on the ground of the road with points positioned on the crosswalk, using the characteristics of the crosswalk in that the crosswalk is divided into longitudinal area units and the lateral length of the crosswalk is greater than those of other signs. Thus, the crosswalk detection device 100 may have robust effect on accurate detection since the crosswalk detection device 100 can distinguish the crosswalk from other signs existed on the road.

The crosswalk tracking unit 150 may track the position of the crosswalk using a Kalman filter in order to detect a more accurate position of the crosswalk, since the position of the crosswalk may be dislocated according to the movement of the lidar sensor (or the vehicle equipped with the lidar sensor).

More specifically, the crosswalk tracking unit 150 may input the position of the crosswalk detected at a first time point and a moving speed of the lidar sensor (or the vehicle equipped with the lidar sensor) and estimate the position of the crosswalk at a second time point after the first time point. Then, the crosswalk tracking unit 150 may correct the position of the crosswalk using the difference between the estimated position of the crosswalk and the detected position of the crosswalk detected at the second time point.

Accordingly, the crosswalk detection device 100 may accurately detect the position of the crosswalk even through the lidar sensor is moving.

Figure 7:
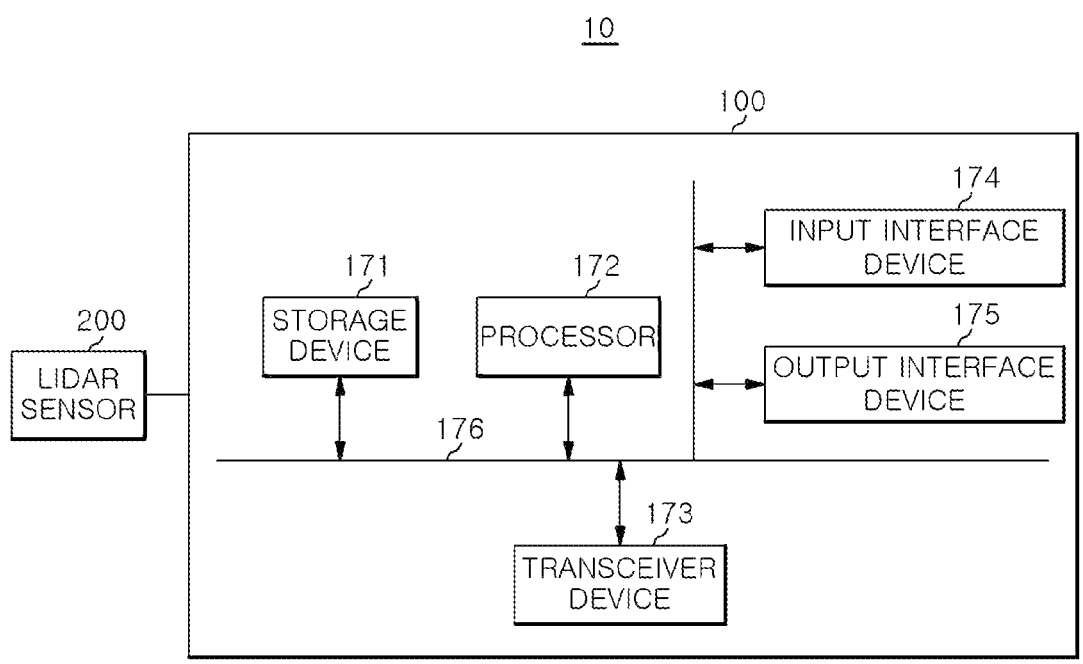
FIG. 7 is a block diagram for explaining the crosswalk detection device included in the crosswalk detection system in an aspect of hardware.

FIG. 7 is a block diagram for explaining the crosswalk detection device included in the crosswalk detection system in an aspect of hardware.

Referring to FIG. 1 and FIG. 7, the crosswalk detection device 100 may include a storage device 171 that stores at least one instruction, a processor 172 that executes the at least one instruction stored in the storage device 171, a transceiver device 173, an input interface device 174 and an output interface device 175.

The storage device 171, the processor 172, the transceiver device 173, the input interface device 174, and the output interface device 175 included in the crosswalk detection device 100 may communicate with each other through the connection by a data bus 176.

The storage device 171 may include at least one of a memory, a volatile storage medium, or a nonvolatile storage medium. For example, the storage device 171 may include at least one of a read only memory (ROM) or a random access memory (RAM).

The storage device 171 may include at least one instruction executed by the processor to be described later, and may store information about the size of the crosswalk cell inputted from a user through the input interface device 174, the predetermined first length and the predetermined second length, the number of crosswalk lines for determining the crosswalk area, and the like.

The processor 172 may include a central processing unit (CPU), a graphics processing unit (GPU), a micro controller unit (MCU), or an exclusive processor configured to execute the methods according to the embodiments of the present disclosure.

As described above, the processor 172 may perform the functions of the ground detection unit 120, the crosswalk point detection unit 130, the crosswalk detection unit 140 and the crosswalk tracking unit 150 by executing at least one instruction stored in the storage device 171. Alternatively, each of the ground detection unit 120, the crosswalk point detection unit 130, the crosswalk detection unit 140 and the crosswalk tracking unit 150 may be stored in a memory in the form of at least one module and executed by the processor 172.

The transceiver device 173 may receive and transmit data to and from internal devices or external devices that are connected to the transceiver device 173 through a wireless or a wired communication. Further, the transceiver device 173 may perform the function of the point data receiving unit 110. For example, the transceiver device 173 may receive point data acquired from the lidar sensor 200, and may acquire moving information of the lidar sensor (or the vehicle equipped with the lidar sensor).

The input interface device 174 may receive input of at least one control signal or at least one set value. For example, the input interface device 174 may receive user input such as information about the size of the crosswalk cell, the predetermined first length and the predetermined second length, the number of crosswalk lines for determining the crosswalk area and a start command for the crosswalk detection.

The output interface device 175 may output and visualize at least one information including the position of the crosswalk by the operation of the processor 172.

The crosswalk detection device 100 according to the embodiment of the present disclosure has been explained. Hereinafter, according to another embodiment of the present disclosure, the crosswalk detection method performed by the processor provided in the crosswalk detection device will be described.

Figure 8:
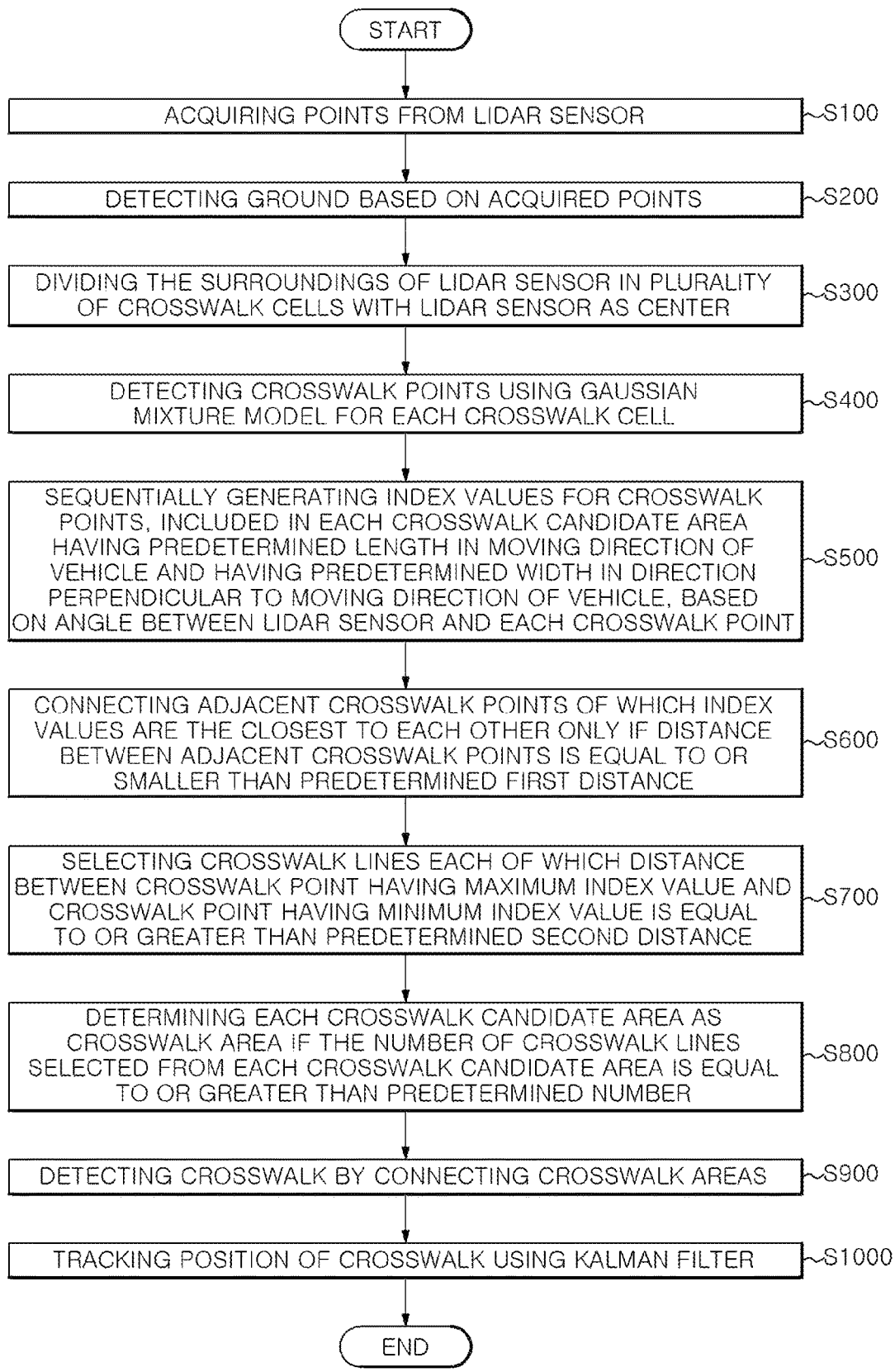
FIG. 8 is a flowchart illustrating a method for detecting the crosswalk by the crosswalk detection device according to the embodiment of the present disclosure.

FIG. 8 is a flowchart illustrating a method for detecting the crosswalk by the crosswalk detection device according to the embodiment of the present disclosure.

Referring to FIG. 8, the transceiver device 173 may acquire point data around the lidar sensor from the lidar sensor 200 (step S100).

Then, the processor 172 may detect a ground based on the acquired point data (step S200).

The processor 172 may detect a ground plane by using a method in which the ground detection unit 120 detects the ground plane using a plane fitting method. The ground plane detection method has been described above.

The processor 172 may divide the surroundings of the lidar sensor into a plurality of crosswalk cells with the lidar sensor as the center (the origin point) (step S300), and detect the crosswalk points using the Gaussian mixture model for each cell (step S400).

The processor 172 may set the size of each crosswalk cell, and detect the crosswalk points by dividing inlier points included in the ground plane into the ground points and the crosswalk points for each crosswalk cell.

Then, the processor 172 may detect the crosswalk using the detected crosswalk points.

First, the processor 172 may sequentially generate index values for the crosswalk points included in each of the crosswalk candidate areas having a predetermined length in the moving direction of the vehicle and having a predetermined width in a direction perpendicular to the moving direction of the vehicle. Specifically, the index values are sequentially selected among integers equal to or greater than 0 based on an angle between a reference line extending in a left horizontal direction from the lidar sensor and a straight line connecting the lidar sensor and each of the crosswalk points included in each of the crosswalk candidate areas or based on an angle between a reference line extending in a right horizontal direction from the lidar sensor and a straight line connecting the lidar sensor and each of the crosswalk points included in each of the crosswalk candidate areas (step S500).

Here, the index values for the crosswalk points may be generated such that a crosswalk point having a greater angle has a greater index value.

Then, the processor 172 may connect adjacent crosswalk points of which the index values are the closest to each other only if the distance between the adjacent crosswalk points is equal to or smaller than a predetermined first length (step S600).

Further, the processor 172 may select crosswalk lines each of which the distance between a crosswalk point having the maximum index value and a crosswalk point having the minimum index value is equal to or greater than a predetermined second length (step S700).

Then, the processor 172 may determine each of the crosswalk candidate areas as the crosswalk area when the number of crosswalk lines selected from the crosswalk candidate area is equal to or greater than a predetermined number (step S800).

The processor 172 may detect the crosswalk by connecting the determined crosswalk areas and determining the lateral and longitudinal lengths of the crosswalk (step S900).

Finally, the processor 172 may track the position of the crosswalk using a Kalman filter by the inputs of position information of the crosswalk detected at a first time point, position information of the crosswalk detected a second time point, and moving information of the vehicle acquired from the transceiver device 173 (step S1000).

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A method for detecting a crosswalk using a crosswalk detection device, the method comprising:
    acquiring point data around a lidar sensor from the lidar sensor;
    detecting at least one crosswalk point among a plurality of points included in the point data based on intensities of the plurality of points; and
    detecting the crosswalk based on positions of the at least one crosswalk point,
    wherein the detecting of the at least one crosswalk point comprises:
        dividing a surrounding area detected by the crosswalk detection device or the lidar sensor into crosswalk cells with each of the crosswalk cells having a predetermined length in a moving direction of a driving vehicle and a predetermined width in a direction perpendicular to the moving direction of the driving vehicle; and
        detecting, among the at least one crosswalk point included in the point data, a subset of the at least one crosswalk point in the each of the crosswalk cells.

2. The method of claim 1, wherein the detecting of the at least one crosswalk point comprises:
    calculating a threshold for point intensity by applying a Gaussian mixture model to the plurality of points included in the each of the crosswalk cells among the plurality of points included in the point data based on differences between the intensities of the plurality of points included in the each of the crosswalk cells; and
    determining at least one point having intensities equal to or greater than the threshold, among the plurality of points included in the each of the crosswalk cells, as the at least one crosswalk point.

3. The method of claim 1, further comprising:
    detecting a ground based on the intensities of the plurality of points included in the point data before the detecting of the at least one crosswalk point,
    wherein the detecting of the ground comprises:
        generating a first plane by using first points selected from the plurality of points;
        generating a second plane which is different from the first plane by using second points selected from the plurality of points; and
        determining the first plane as the ground when a number of first inlier points included in the first plane is greater than a number of second inlier points included in the second plane, wherein the at least one crosswalk point is included in the first plane.

4. The method of claim 1, wherein the detecting of the crosswalk comprises:
    dividing the surrounding area detected by the crosswalk detection device or the lidar sensor into crosswalk candidate areas with each of the crosswalk candidate areas having a predetermined length in a moving direction of a driving vehicle and a predetermined width in a direction perpendicular to the moving direction of the driving vehicle; and
    detecting a crosswalk area by determining whether the each of the crosswalk candidate areas corresponds to the crosswalk area based on positions of a subset of the at least one crosswalk point included in the each of the crosswalk candidate areas.

5. The method of claim 4, wherein the detecting of the crosswalk area comprises:
sequentially selecting index values, among integers equal to or greater than 0, for the at least one crosswalk point included in the each of the crosswalk candidate areas, the index values being sequentially selected based on an angle between a reference line extending in a horizontal direction from the lidar sensor and a straight line connecting the lidar sensor and each of the at least one crosswalk point included in the each of the crosswalk candidate areas;
connecting adjacent crosswalk points of which the index values are the closest to each other among the at least one crosswalk point included in the each of the crosswalk candidate areas, only if a distance between the adjacent crosswalk points is equal to or smaller than a predetermined first length;
generating, for the each of the crosswalk candidate areas, a plurality of crosswalk lines each of which straightly connects a crosswalk point having a maximum index value and a crosswalk point having a minimum index value among the adjacent crosswalk points; and
determining the each of the crosswalk candidate areas as the crosswalk area when a number of the plurality of crosswalk lines, having a length equal to or greater than a predetermined second length, is equal to or greater than a predetermined number.

6. The method of claim 5, wherein the sequentially selecting of the index values for the at least one crosswalk point comprises generating the index values such that a crosswalk point having a greater angle has a greater index value.

7. The method of claim 6, wherein the detecting of the crosswalk further comprises detecting the crosswalk by connecting the each of the crosswalk candidate areas determined as the crosswalk area in the moving direction of the driving vehicle.

8. The method of claim 1, further comprising:
inputting a position of the crosswalk detected at a first time point and a moving information of the lidar sensor;
estimating a position of the crosswalk at a second time point after the first time point; and
correcting the position of the crosswalk using a difference between the position of the crosswalk at the second time point and the position of the crosswalk detected at the first time point.

9. A system for detecting a crosswalk, the system comprising:
a lidar sensor configured to acquire point data by detecting a vicinity of the lidar sensor; and
a crosswalk detection device for detecting the crosswalk, the crosswalk detection device including:
a transceiver configured to receive the point data from the lidar sensor; and
a processor configured to control the transceiver,
wherein the processor is configured to perform a method comprising:
detecting at least one crosswalk point among a plurality of points included in the point data based on intensities of the plurality of points; and
detecting the crosswalk based on positions of the at least one crosswalk point,
wherein the detecting of the at least one crosswalk point comprises:
dividing a surrounding area detected by the crosswalk detection device or the lidar sensor into crosswalk cells with each of the crosswalk cells having a predetermined length in a moving direction of a driving vehicle and a predetermined width in a direction perpendicular to the moving direction of the driving vehicle; and
detecting, among the at least one crosswalk point included in the point data, a subset of the at least one crosswalk point in the each of the crosswalk cells.

10. A non-transitory computer-readable storage medium storing computer-executable instructions which cause, when executed by a processor, the processor to perform a method for detecting a crosswalk using a crosswalk detection device, the method comprising:
acquiring point data around a lidar sensor from the lidar sensor;
detecting at least one crosswalk point among a plurality of points included in the point data based on intensities of the plurality of points; and
detecting the crosswalk based on positions of the at least one crosswalk point,
wherein the detecting of the at least one crosswalk point comprises:
dividing a surrounding area detected by the crosswalk detection device or the lidar sensor into crosswalk cells with each of the crosswalk cells having a predetermined length in a moving direction of a driving vehicle and a predetermined width in a direction perpendicular to the moving direction of the driving vehicle; and
detecting, among the at least one crosswalk point included in the point data, a subset of the at least one crosswalk point in the each of the crosswalk cells.

11. The non-transitory computer-readable storage medium of claim 10, wherein the detecting of the at least one crosswalk point comprises:
calculating a threshold for point intensity by applying a Gaussian mixture model to the plurality of points included in the each of the crosswalk cells among the plurality of points included in the point data based on differences between the intensities of the plurality of points included in the each of the crosswalk cells; and
determining at least one point having intensities equal to or greater than the threshold, among the plurality of points included in the each of the crosswalk cells, as the at least one crosswalk point.

12. The non-transitory computer-readable storage medium of claim 10, wherein the method further comprises:
detecting a ground based on the intensities of the plurality of points included in the point data before the detecting of the at least one crosswalk point,
wherein the detecting of the ground comprises:
generating a first plane by using first points selected from the plurality of points;
generating a second plane which is different from the first plane by using second points selected from the plurality of points; and
determining the first plane as the ground when a number of first inlier points included in the first plane is greater than a number of second inlier points included in the second plane, wherein the at least one crosswalk point is included in the first plane.

13. The non-transitory computer-readable storage medium of claim 10, wherein the detecting of the crosswalk comprises:
dividing the surrounding area detected by the crosswalk detection device or the lidar sensor into crosswalk candidate areas with each of the crosswalk candidate areas having a predetermined length in a moving direction of a driving vehicle and a predetermined width in a direction perpendicular to the moving direction of the driving vehicle; and detecting a crosswalk area by determining whether the each of the crosswalk candidate areas corresponds to the crosswalk area based on positions of a subset of the at least one crosswalk point included in the each of the crosswalk candidate areas.

14. The non-transitory computer-readable storage medium of claim 13, wherein the detecting of the crosswalk area comprises:

sequentially selecting index values, among integers equal to or greater than 0, for the at least one crosswalk point included in the each of the crosswalk candidate areas, the index values being sequentially selected based on an angle between a reference line extending in a horizontal direction from the lidar sensor and a straight line connecting the lidar sensor and each of the at least one crosswalk point included in the each of the crosswalk candidate areas;

connecting adjacent crosswalk points of which the index values are the closest to each other among the at least one crosswalk point included in the each of the crosswalk candidate areas, only if a distance between the adjacent crosswalk points is equal to or smaller than a predetermined first length;

generating, for the each of the crosswalk candidate areas, a plurality of crosswalk lines each of which straightly connects a crosswalk point having a maximum index value and a crosswalk point having a minimum index value among the adjacent crosswalk points; and determining the each of the crosswalk candidate areas as the crosswalk area when a number of the plurality of crosswalk lines, having a length equal to or greater than a predetermined second length, is equal to or greater than a predetermined number.

15. The non-transitory computer-readable storage medium of claim 14, wherein the sequentially selecting of the index values for the at least one crosswalk point comprises generating the index values such that a crosswalk point having a greater angle has a greater index value, and wherein the detecting of the crosswalk further comprises detecting the crosswalk by connecting the crosswalk candidate areas in the moving direction of the driving vehicle.

16. The non-transitory computer-readable storage medium of claim 10, wherein the method further comprises:

inputting a position of the crosswalk detected at a first time point and a moving information of the lidar sensor;

estimating a position of the crosswalk at a second time point after the first time point; and correcting the position of the crosswalk using a difference between the position of the crosswalk at the second time point and the position of the crosswalk detected at the first time point.

* * * * *